D. W. CONNELL.
RUNNING GEAR.
APPLICATION FILED JAN. 4, 1908.
903,544.
Patented Nov. 10, 1908.
2 SHEETS—SHEET 1.
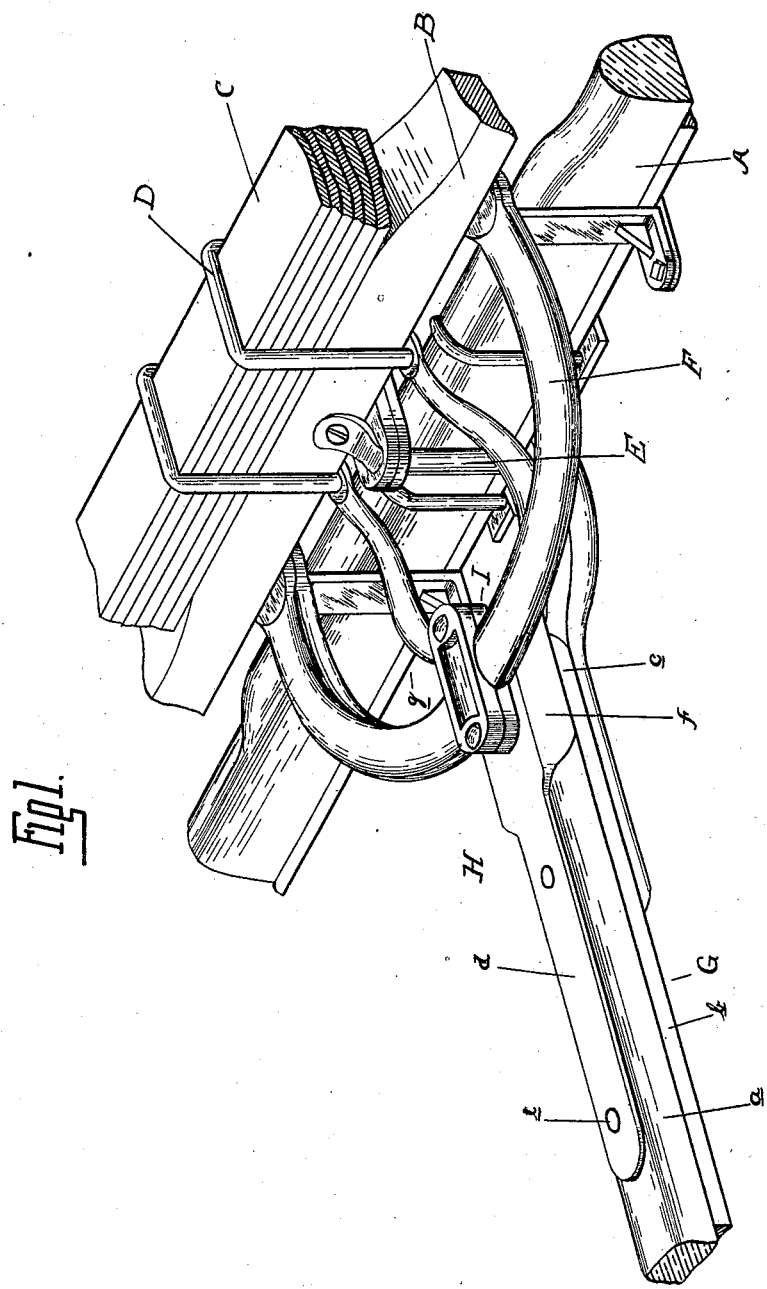
Witnesses
Inventor
David W. Connell
By

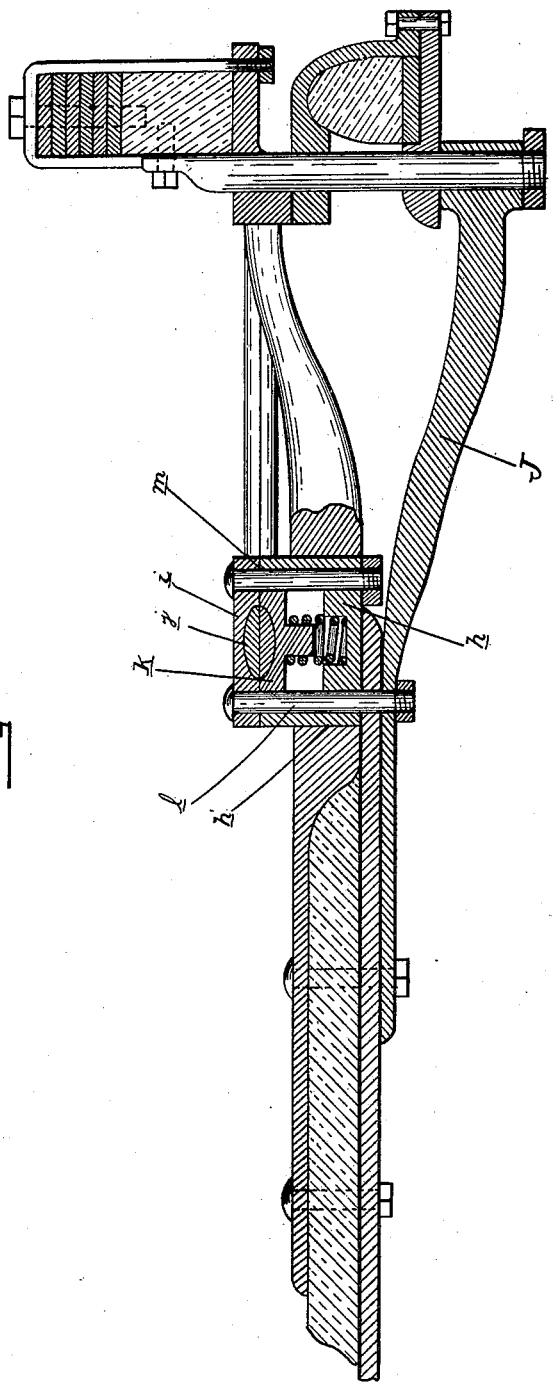

UNITED STATES PATENT OFFICE.

DAVID W. CONNELL, OF PONTIAC, MICHIGAN, ASSIGNOR TO PONTIAC BUGGY COMPANY, OF PONTIAC, MICHIGAN, A CORPORATION OF MICHIGAN.

RUNNING-GEAR.

No. 903,544.     Specification of Letters Patent.     Patented Nov. 10, 1908.

Application filed January 4, 1908. Serial No. 409,323.

*To all whom it may concern:*

Be it known that I, DAVID W. CONNELL, a citizen of the United States of America, residing at Pontiac, in the county of Oakland and State of Michigan, have invented certain new and useful Improvements in Running-Gears, of which the following is a specification, reference being had therein to the accompanying drawings.

The invention relates generally to a running gear for vehicles, and particularly to the construction of the reach, and it consists in a novel form of reach coupling, in the peculiar manner in which it is combined with the other parts of the running gear, and further in the novel arrangement and combination of the various parts, as will be hereinafter set forth.

In the drawings, Figure 1 is a sectional perspective view illustrating my invention; and Fig. 2 is a vertical central section therethrough.

The reference letter A designates the front axle of a vehicle, B the bolster, C the spring, and D the usual clips connecting the spring to the bolster.

E represents the king bolt, F the fifth wheel, G a reach bar extending to the wheel, and H my improved reach coupling connecting the parts. The reach bar I have shown as of the composite type, consisting of a wooden member $a$ extending to a point in proximity to the fifth wheel and a metallic reinforcing member $b$ projecting beyond the wooden member, forming a seat or flange $c$ upon which a portion of the reach coupling is mounted.

The preferred form of coupling is as illustrated, consisting preferably of a forging comprising a body section $d$ rigidly attached to the reach bar by bolts or other securing devices $e$, and having a thickened portion or enlargement $f$ adapted to seat upon the flange $c$, and a forked section $g$ projecting forwardly to the bolster upon opposite sides of the king bolt, and secured to the former by the spring clips D, as plainly shown in Fig. 1. As thus constructed, the coupling forms a continuation of the reach bar, and is so fashioned as to extend beneath the fifth wheel, thereby providing a maximum space between the vehicle body and the reach, and preventing the parts striking.

I designates an anti-rattler for the fifth wheel, which may be of any approved construction and which I have here shown as mounted upon the coupling. It comprises a socket section $h$ arranged within a recess $h'$ formed in the enlargement $f$ of the coupling for that purpose, a cap $i$ recessed as at $j$ to conform to the upper portion of the fifth wheel, and a spring-pressed member $k$ similarly recessed to engage the under portion of the wheel, as indicated in Fig. 2. The anti-rattler sections are held in their proper relative positions by bolts $l$ and $m$, and the bolt $l$ is of a length to extend through the anti-rattler and the forward portion of the reach bar, forming the connection between the anti-rattler and the reach coupling.

J represents the usual connecting member extending from the lower end of the king bolt to the reach bar, and I have here shown this member as being secured to the reach by the bolt $l$ previously referred to and by one of the securing devices $e$ which holds the body of the reach coupling to the reach bar.

What I claim as my invention is,—

1. In a vehicle running gear, the combination with the forward bolster, fifth wheel and king bolt, of a single reach member arranged centrally of the running gear and extending in proximity to the bolster, and a perch iron positioned beneath the fifth wheel comprising a body section fixedly secured to the reach, and a forked section straddling the king bolt and secured to the bolster.

2. In a vehicle running gear, the combination with the forward bolster and its king bolt, of the spring and its securing clips, a single reach bar arranged centrally of the running gear and extending in proximity to the bolster, and a perch iron secured to the reach having a forked forward section extending on opposite sides of the king bolt and secured to the bolster by means of the spring clips.

3. In a vehicle running gear, the combination with the forward bolster and fifth wheel, of a single centrally positioned reach comprising a reach bar projecting in proximity to the bolster and a perch iron extending beneath the fifth wheel and having a forked forward section connected to the bolster on opposite sides of the king bolt, and a single anti-rattler for the fifth wheel seated centrally of the latter within a recess in the perch iron.

4. In a vehicle running gear, the combination with the rear and forward bolsters, of a fifth wheel, a single centrally positioned reach comprising a reach bar projecting in proximity to the bolster and a perch-iron extending underneath the fifth wheel and having a forked forward section connected to the bolster on opposite sides of the king bolt, and an anti-rattler for said fifth wheel positioned centrally of the same.

5. In a vehicle running gear, the combination with the forward bolster and king bolt, of a single reach bar extending in proximity to the bolster, a perch iron connecting the latter with the bolster, a brace member beneath the reach having its forward end secured to the king bolt, a fifth wheel, an anti-rattler seated in a recess in the perch iron, and a member extending through the anti-rattler, perch-iron and brace, for securing the parts together.

6. In a vehicle running gear, the combination with the forward bolster, the king bolt, the spring and its securing clips, of a single reach bar extending in proximity to the bolster, a perch-iron connecting the parts comprising a body section fixedly secured to the reach, and a forked forward section straddling the king bolt and connected by means of the spring clips to the bolster, a reinforcing plate beneath the reach and extending beyond the same into engagement with the perch-iron, a brace member having its forward end connected to the king bolt, a fifth wheel and an anti-rattler for said fifth wheel secured to the perch-iron.

7. In a vehicle running gear, the combination with the forward bolster and king bolt, of a single reach bar extending in proximity to the bolster, a perch-iron connecting the parts comprising a body section fixedly secured to the reach and a forked forward section straddling the king bolt and connected to the bolster, a reinforcing plate beneath the reach bar extending beyond the same into engagement with the perch-iron, a brace member beneath the reinforcing plate having its forward end connected to the king bolt, a fifth wheel, and an anti-rattler for said fifth wheel seated in a recess in the perch iron.

8. In a vehicle running gear, the combination with the forward bolster, the king bolt, the spring, and its securing clips, of a single reach bar extending in proximity to the bolster, a perch iron connecting the parts comprising a body section fixedly secured to the reach and a forked forward section straddling the king bolt and connected by means of the spring clips to the bolster, a reinforcing plate beneath the reach extending beyond the same into engagement with the perch-iron, a brace member beneath the reinforcing plate having its forward end connected to the king bolt, and a member extending through said perch-iron, reinforcing plate and brace member for securing the parts together.

9. In a vehicle running gear, the combination with the forward bolster and the king bolt, of a single reach bar extending in proximity to the bolster, a perch-iron connecting the parts comprising a body section fixedly secured to the reach and a forked forward section straddling the king bolt and connected to the bolster, a reinforcing plate beneath the reach and extending beyond the same into engagement with the perch-iron, a brace member beneath the reinforcing plate having its forward section connected to the king bolt, a fifth wheel, and a sectional anti-rattler having its sections on opposite sides of the fifth wheel and a member extending through the anti-rattler sections, the perch-iron, reinforcing plate and the brace for securing the parts together.

10. In a vehicle running gear, the combination with the forward bolster, the king bolt, the spring and its securing clips, of a single reach bar extending in proximity to the bolster, a perch-iron connecting the parts comprising a body section fixedly secured to the reach and a forked forward section straddling the king bolt and connected by means of the spring clips to the bolster, a reinforcing plate beneath the reach and extending beyond the same into engagement with the perch-iron, a brace member beneath the reinforcing plate having its forward section connected to the king bolt, a fifth wheel, a sectional anti-rattler, and a member extending through the anti-rattler, perch-iron, reinforcing plate and the brace for securing the parts together.

In testimony whereof I affix my signature in presence of two witnesses.

DAVID W. CONNELL.

Witnesses:
H. H. BASSETT,
E. B. LINABURY.